United States Patent
Chung et al.

(10) Patent No.: US 12,372,999 B2
(45) Date of Patent: Jul. 29, 2025

(54) SUPPORT STRUCTURES FOR HARDWARE ELEMENTS

(71) Applicant: Hewlett-Packard Development Company, L.P., Spring, TX (US)

(72) Inventors: Tien Liang Chung, Taipei (TW); Justin Tinhsi Lee, Taipei (TW); Chien-Yi Wang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 169 days.

(21) Appl. No.: 17/919,235

(22) PCT Filed: Apr. 23, 2020

(86) PCT No.: PCT/US2020/029634
§ 371 (c)(1),
(2) Date: Oct. 14, 2022

(87) PCT Pub. No.: WO2021/216074
PCT Pub. Date: Oct. 28, 2021

(65) Prior Publication Data
US 2023/0152843 A1 May 18, 2023

(51) Int. Cl.
*G06F 1/16* (2006.01)
*F16M 13/02* (2006.01)

(52) U.S. Cl.
CPC .......... *G06F 1/1601* (2013.01); *F16M 13/02* (2013.01)

(58) Field of Classification Search
None
See application file for complete search history.

(56) References Cited

U.S. PATENT DOCUMENTS

| | | | | |
|---|---|---|---|---|
| 6,002,581 A | * | 12/1999 | Lindsey | G06F 1/166 361/679.55 |
| 6,353,968 B1 | * | 3/2002 | Shyu | E05D 11/1007 16/334 |
| 6,364,260 B1 | * | 4/2002 | Lorincz | A47B 96/06 211/113 |
| 6,812,958 B1 | * | 11/2004 | Silvester | H04N 23/51 348/E5.026 |

(Continued)

FOREIGN PATENT DOCUMENTS

| CN | 201839409 U | 5/2011 |
|---|---|---|
| CN | 203909668 U | 10/2014 |

OTHER PUBLICATIONS

Geekria, "Geekria Headphones Monitor Mount Hanger," retrieved from: https://www.amazon.in/Geekria-Headphones-Monitor-Headphone-Headset/dp/B01N54IDEL, retrieved on: Nov. 4, 2016, pp. 5.

*Primary Examiner* — Imani N Hayman
*Assistant Examiner* — Rashen E Morrison
(74) *Attorney, Agent, or Firm* — Quarles & Brady LLP

(57) ABSTRACT

According to an example, an electronic device comprises a device housing having an outer surface, a pivot element disposed within an indentation having a set of detents, and a support structure rotatable about the pivot element. The support structure may comprise a projecting element to engage with each detent of the set of detents. Upon a force being applied at a first portion of the support structure, the support structure is to rotate such that a second portion of the support structure is to protrude from the outer surface of the device housing.

15 Claims, 5 Drawing Sheets

(56) References Cited

U.S. PATENT DOCUMENTS

| | | | | |
|---|---|---|---|---|
| 7,681,859 B2 * | 3/2010 | Kim | F16M 11/10 | 248/688 |
| 7,857,178 B2 * | 12/2010 | Brown, Jr. | B60R 11/0247 | 224/547 |
| 7,969,505 B2 * | 6/2011 | Saito | G06F 1/1684 | 362/11 |
| 8,162,283 B1 * | 4/2012 | Royz | H04M 1/04 | 248/455 |
| 8,767,395 B2 * | 7/2014 | Yoo | G06F 1/1632 | 16/334 |
| 8,936,229 B2 * | 1/2015 | Zhu | H04M 1/04 | 248/688 |
| 8,960,618 B2 * | 2/2015 | Chen | F16M 13/02 | 248/222.51 |
| 9,195,265 B1 * | 11/2015 | Jackson | G06F 1/1611 | |
| 9,329,639 B2 * | 5/2016 | Lee | G06F 1/166 | |
| 9,549,479 B2 * | 1/2017 | Gault | G06F 1/1681 | |
| 9,866,663 B2 * | 1/2018 | Kim | H04B 1/3888 | |
| 9,964,997 B2 * | 5/2018 | Gueorguiev | G06F 1/1679 | |
| 10,123,645 B2 * | 11/2018 | Bacallao | A47G 29/10 | |
| 10,136,525 B2 * | 11/2018 | Huang | H05K 5/03 | |
| 10,827,050 B2 * | 11/2020 | Yang | H04M 1/0264 | |
| 11,064,629 B2 * | 7/2021 | Yang | H05K 7/1487 | |
| 2006/0168759 A1 * | 8/2006 | Laursen | H04Q 1/09 | 16/358 |
| 2007/0205346 A1 * | 9/2007 | Jackson | A47G 25/0614 | 248/307 |
| 2008/0067307 A1 * | 3/2008 | Sheu | A47B 96/06 | 248/213.2 |
| 2008/0123314 A1 * | 5/2008 | Cheng | G06F 1/1616 | 361/809 |
| 2010/0020182 A1 * | 1/2010 | Wang | G03B 17/00 | 348/207.1 |
| 2011/0050910 A1 * | 3/2011 | Fan | H04N 23/51 | 348/207.1 |
| 2011/0114806 A1 * | 5/2011 | Losaw | F16B 45/023 | 248/225.21 |
| 2011/0164358 A1 * | 7/2011 | Duan | H05K 5/0234 | 361/679.01 |
| 2012/0106047 A1 * | 5/2012 | Chu | G06F 1/166 | 361/679.01 |
| 2013/0314858 A1 * | 11/2013 | Hung | G06F 1/166 | 361/679.01 |
| 2014/0042287 A1 * | 2/2014 | Stein | A47G 29/083 | 248/324 |
| 2018/0146561 A1 * | 5/2018 | Huang | H05K 5/03 | |

* cited by examiner

SUPPORT STRUCTURES FOR HARDWARE ELEMENTS

BACKGROUND

Electronic devices such as computing devices may be used along external hardware elements, e.g., accessories. These external hardware elements may be supported on a housing of the computing device, in some situations, or otherwise kept close to the electronic device for easy use.

BRIEF DESCRIPTION OF DRAWINGS

Features of the present disclosure are illustrated by way of example and are not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to.

Electronic devices comprise housings in which hardware elements are disposed. These electronic devices may be used along additional external hardware elements, such as headphones, earphones, computer mice, microphones, joysticks, remote controls, amongst other examples. A user may want to stow one (or more) of his/her external hardware elements by its electronic device so as to keep them close to the electronic device when hardware elements are not being used.

Support structures for hardware elements may be disposed on an external surface of an electronic device as a part of the device housing in order to help stow hardware elements such as accessories. However, these support structures may deteriorate the look of the electronic device. In order to provide more flexibility to the users, attachable support structures may be provided as a complement for the electronic devices. However, as previously explained, the aesthetic of the attachable support structure may also negatively affect the look of the electronic device.

In order to stow or support external hardware elements, foldable supports may be incorporated in the device housings. These foldable supports may enable a user to select its preferred configuration for its external hardware element(s). The foldable nature of the foldable supports may help preserve or improve the aesthetics or appearance of the electronic device while providing a support for external hardware elements when desired.

Disclosed herein are examples of electronic devices comprising foldable support structures to hold external hardware elements through foldable elements. Hence, different examples of device housings, support structures, and systems are described.

Examples of support structures comprise hangers, hooks, tabs, or any other element rotatable about a pivot element having a series of angular positions.

Throughout this description, the term "electronic device" refers generally to electronic devices that comprise support structures for external hardware elements. Examples of electronic devices comprise displays, computer desktops, all-in-one computers, portable computers, printers, and additive manufacturing machines (3D printers), amongst others.

Figure 1A:
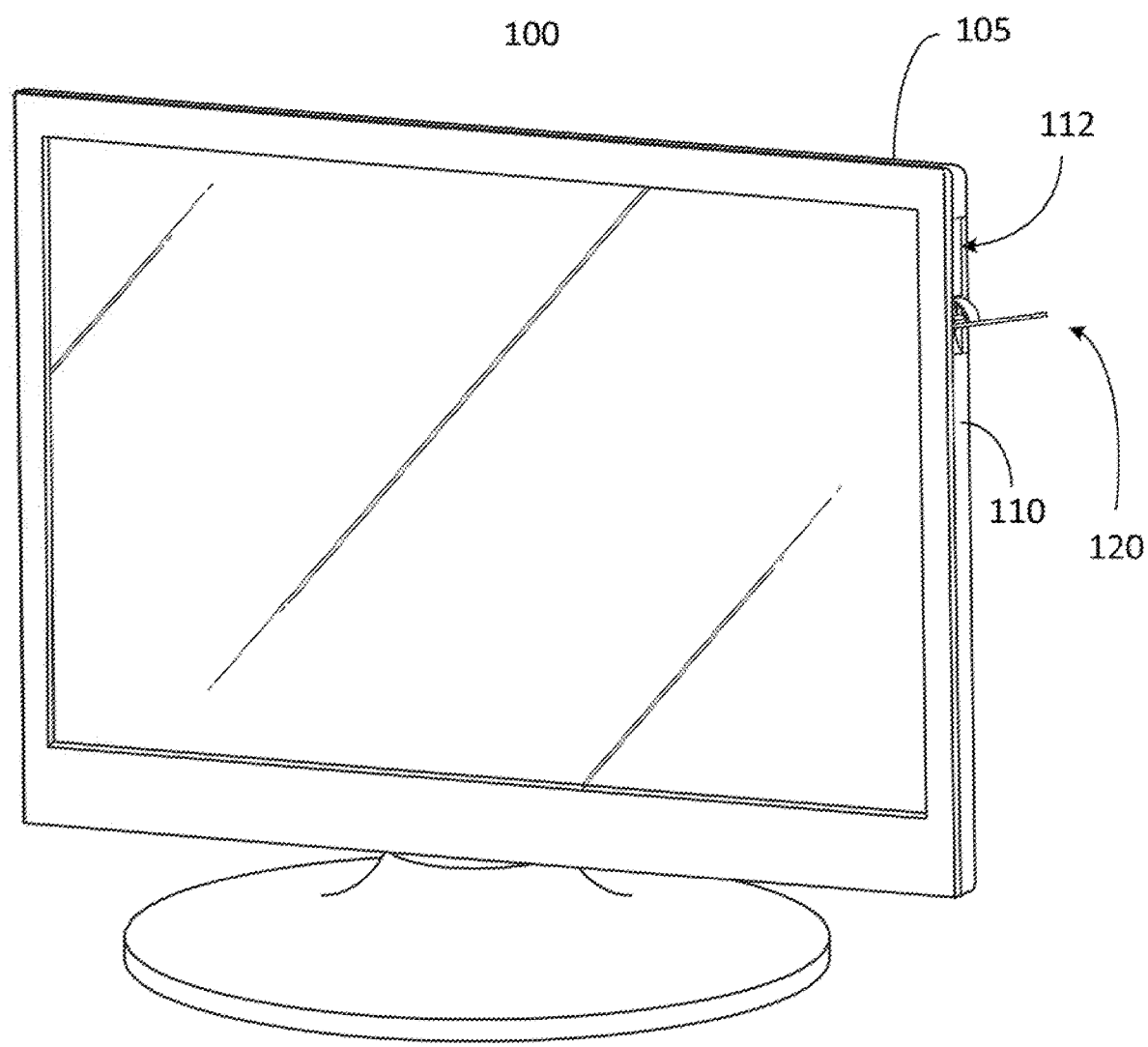
FIG. 1A shows an electronic device having a support structure for an external hardware element, according to an example of the present disclosure.

Referring now to FIG. 1A, an electronic device 100 comprising a device housing 105 and a support structure 120 is shown. The device housing 105 comprises an outer surface 110, wherein the outer surface 110 may have different geometries depending on the device housing 105 of the electronic device 100. The outer surface 110 comprises an indentation 112, which may be a cavity within the device housing 105 relative to the outer surface 110. The support structure 120 is rotatable about a pivot element (not shown in FIG. 1) so as to provide a support surface to an external hardware element. Since the support structure 120 is rotatable, the support structure may be folded and/or unfolded from the cavity 112 whenever a user may want to hold, stow, or otherwise support the external hardware element. In order to define a series of angular positions for the support structure 120, the indentation 112 may comprise braking elements, such as detents or stopping elements.

In some examples, the indentation comprises a set of detents to engage with the support element. The set of detents may comprise a single detent, a first detent and a second detent, or any other configuration that may define a series of angular positions for the support structure.

It should be noted that, although the electronic device of FIG. 1 corresponds to an all-in-one computer, other types of electronic devices may be used, as previously explained in other examples.

Figure 1B:
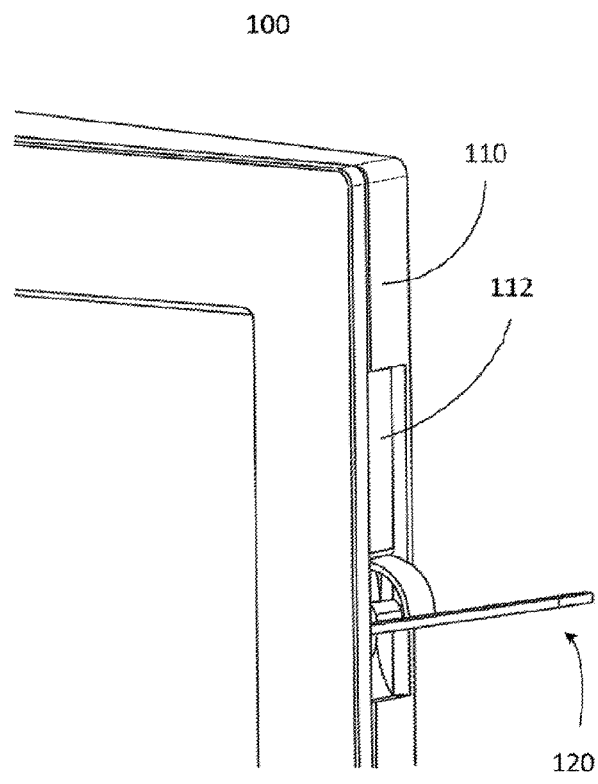
FIG. 1B shows a detailed view of the electronic device of FIG. 1A having the support structure in an open position.

Referring now to FIG. 1B, a detailed view of the electronic device 100 of FIG. 1 having the support structure 120 in an open position is shown. In the open position, the support structure 120 protrudes from the outer surface 110, thus enabling support for an external hardware element. A user may hang, balance, or otherwise support a hardware element by placing it on an inner surface of a portion of the support structure 120 that is protruding from the outer surface 110. In order to balance forces applied at the portion of the support structure 120 that is protruding from the outer surface 110, other elements or structure may be implemented on an opposing side of the pivot element, as described below. In an example, the support structure 120 comprises a projecting element to engage with a set of detents disposed in the indentation 112.

Figure 1C:
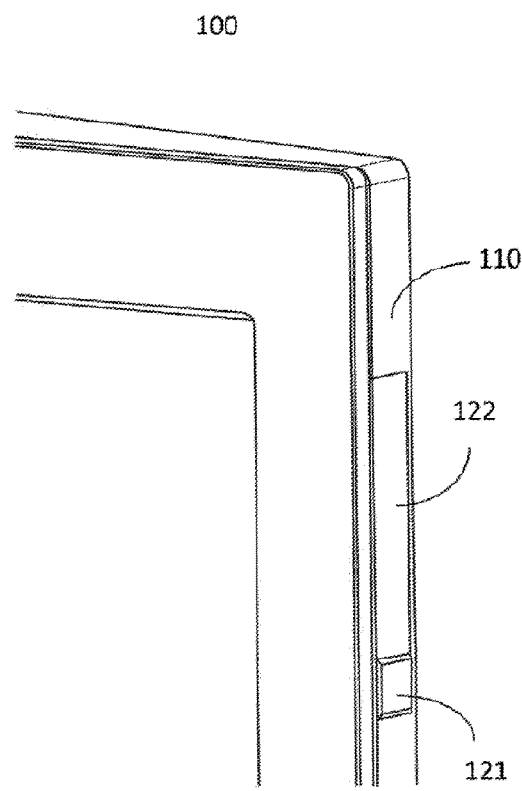
FIG. 1C shows a detailed view of the electronic device of FIG. 1 having the support structure in a closed position.

Referring now to FIG. 1C, a detailed view of the electronic device 100 of FIG. 1 having the support structure 120 in a closed position is shown. In the closed position, a first portion 121 of the support structure 120 and a second portion 122 of the support structure 120 are aligned with the outer surface 110 of the electronic device 100, and therefore, the support structure 120 is aligned with the outer surface 110. A user may select the closed position of the support structure 120 when the hardware element is being used. The first portion 121 may correspond to a portion of the support structure 120 which rotates into the indentation 112 when the support structure 120 is to be used. The second portion 122 may correspond to a portion of the support structure 120 which rotates outwards from the indentation 112 when the support structure 120 is to be used.

A user may change the position of the support structure 120 from the closed position to the open position by applying a force on the first portion 121, e.g., pushing it inwards. Upon application of a force on the first portion 121, the support structure 120 may rotate about the pivot element such that the second portion 122 protrudes from the outer surface 110 of the device housing.

In the same way, a user may change from the open position to the closed position by applying a force on the second portion of the support structure 120 so that the support structure 120 is rotated back within the indentation 112.

In some examples, the open position may be associated to a first locking position of the support structure and the closed position may be associated to a second locking position of the support structure. During a locking position, the support structure may engage with a corresponding detent disposed in the indentation.

Figures 2A, 2B, 2C:
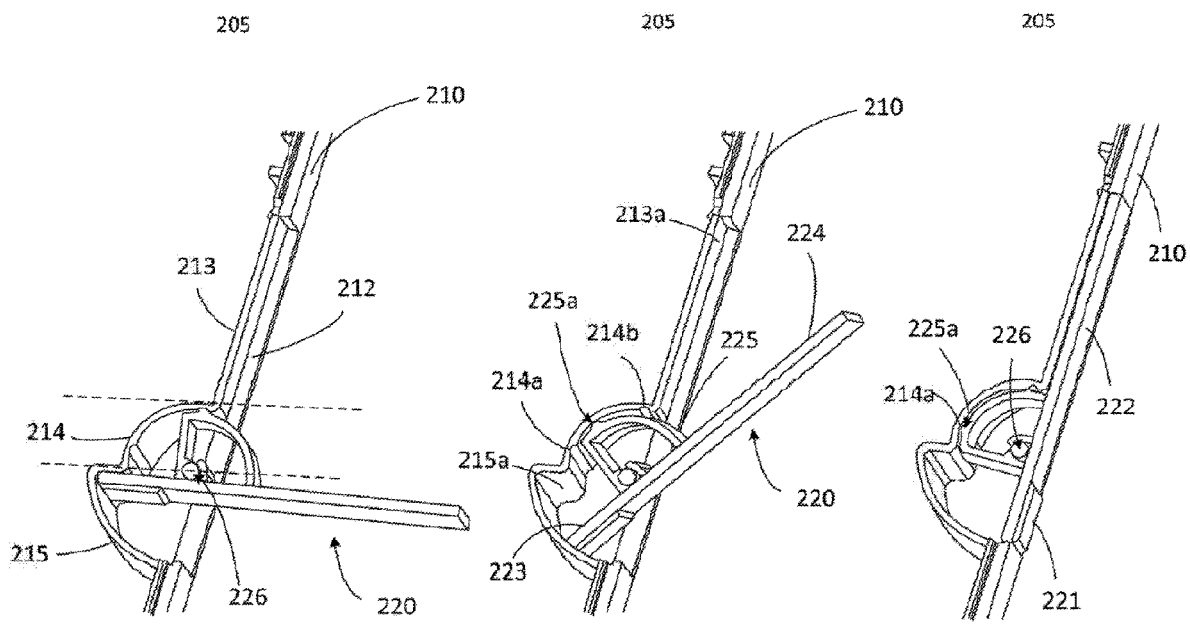
FIG. 2A shows an electronic device housing having a support structure in an open position, according to an example of the present disclosure.
FIG. 2B shows the electronic device housing of FIG. 2A having a support structure in an intermediate position.
FIG. 2C shows the electronic device housing of FIG. 2A having a support structure in a closed position.

Referring now to FIG. 2A, an electronic device housing 205 having a support structure 220 in an open position is shown. In an example, the electronic device housing 205 may correspond to the one previously explained in reference to FIGS. 1A to 1C. The electronic device housing 205 comprises an outer surface 210, an indentation 212, a pivot element 226 disposed within the indentation 212, and a support structure 220. The support structure 220 may correspond to the support structure 120 of FIGS. 1A to 1C. The support structure 220 is rotatable about the pivot element 226, and therefore, a series of positions of the support structure 220 can be obtained based on its rotation. The indentation 212 may comprise different sections, wherein the sections may have different geometries so as to constrain and/or accommodate the rotation of the support structure 220. The pivot element 226 may be a post, pin, rod, hinge, or other type of component capable of enabling rotation of the support structure 220.

In the example of FIG. 2A, the indentation 212 comprises a first linear section 213, a first curved section 214, and a second curved section 215. For illustrative purposes, dashed lines have been added to better define the different sections within the indentation 212. In the open position of the support structure 220, a first inner surface of the support structure 220 contacts a first stopping element comprised within the second curved section 215. In an example, the first stopping element may be a stopper. The first curved section 214 may comprise a set of detents, wherein each detent of the set of detents defines an angular position of the support structure 220. In order to engage with each detent, the support structure 220 comprises a projecting element having a protrusion. In case the protrusion is engaged with a detent, the position of the support structure 220 is locked. As shown, a radius of the first curved section 214 is smaller than a radius of the second curved section 215 so as to enable and/or accommodate a rotation of the support structure 220, and/or the projection element thereof, within the cavity defined by the indentation 212.

Referring now to FIG. 2B, the electronic device housing 205 is shown wherein the support structure 220 is in an intermediate position. In the intermediate position, a protrusion 225a of a projecting element 225 of the support structure 220 is not engaged with either a first detent 214a or a second detent 214b. In other examples, the projecting element 225 may engage with the first detent 214a or the second detent 214b through the protrusion 225a extending from the projection element 225. Upon the protrusion 225a engaging with one detent, a locking position may be defined. In an example, a first locking position corresponds to the protrusion 225a being engaged with the second detent 214b and a second locking position corresponds to the protrusion 225a being engaged with the first detent 214a.

In the example of FIG. 2B, the first linear section 213, the first curved section 214 and the second curved section 215 correspond to the sections previously explained in FIG. 2A. The first linear section 213 comprises a second stopping element 213a to contact with an inner surface 224 of a second portion of the support structure 220. The first curved section 214 comprises the first detent 214a and the second detent 214b. The second curved section 215 comprises a first stopping element 215a to contact an inner surface 223 of a first portion of the support structure 220. Therefore, the support structure 220 is to rotate between the first stopping element 215a and the second stopping element 213a. In other examples, the first stopping element 215a may be alternatively referred to as a stopper.

Although in FIG. 2B the stopping element 215a is comprised in an interface area or wall between the first curved section 214 and the second curved section 215, other different geometries may be possible, such as protruding elements on the second curved section 215 surface. Similarly, in some examples, the second stopping element 213a may be a wall or portion of a surface of the indentation 212. However, in other examples, different geometries are possible, such as protruding elements disposed within the indentation 212.

Referring now to FIG. 2C, the electronic device housing 205 is shown wherein the support structure 220 is in a closed position. In the closed position, the inner surface 224 of the second portion of the support structure 220 contacts the second stopping element 213a disposed within the first linear section 213. In the closed position of the support structure 220, a first portion 221 and a second portion 222 are aligned with the outer surface 210 of the electronic device housing 205. Furthermore, the protrusion 225a of the projecting element 225 of the support structure 220 is engaged with the first detent 214a.

In other examples, the indentation 212 may comprise other geometries. In an example, the indentation 212 comprises a first linear section and a first curved section, wherein the first curved section comprises a protruding element on its surface so as to provide the first stopping element previously described. In other examples, the support structure 220 may further comprise a hook element projecting at a distal side of the inner surface 224 of the second portion. A hook detent may be comprised in the first linear section so as to engage with the hook projecting element of the support structure 220. In other examples, the set of detents may be provided so as to engage with the support structure 220 in an open position but not in the closed position.

Figure 3A:
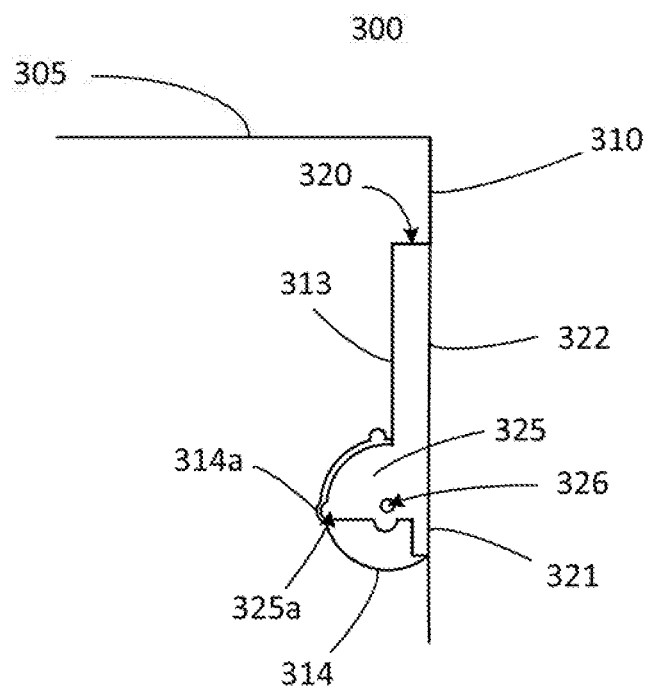
FIG. 3A shows a cross-sectional side view of a device housing and a support structure in a closed position, according to an example of the present disclosure.

Referring now to FIG. 3A, a cross-sectional side view of an electronic device 300 having a support structure 320 in a closed position is shown. The electronic device 300 comprises a device housing 305 having an outer surface 310. An indentation may be defined relative to the outer surface 310 such that the support structure 320 has surfaces aligned with the outer surface 310 in the closed position. The support structure 320 is rotatable about a pivot element 326. As previously explained, examples of pivot elements 326 comprise a post, pin, rod, hinge, or other any other type of component capable of enabling rotation of a support structure 320.

A first portion 321 and a second portion 322 may be defined for the support structure 320 so that a force applied against the first portion 321 rotates the second portion 322 of the support structure 320 outwards from the indentation, and therefore, the support structure 320 protrudes from the outer surface 310. The indentation comprises a first linear section 313 and a first curved section 314, wherein the first curved section 314 comprises a set of detents.

In the closed position, a first detent 314a engages with a projecting element 325 of the support structure 320 through a protrusion 325a. In the closed position of the support structure 320, an inner surface of the second portion 322 of the support structure 320 contacts at least a portion of the first linear section 313.

Figure 3B:
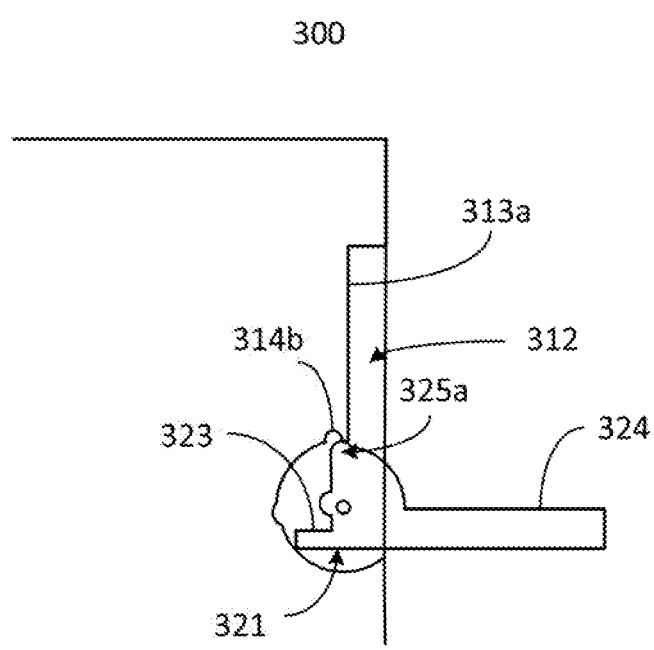
FIG. 3B shows a cross-sectional side view of the device housing and the support structure of FIG. 3A in an open position.

Referring now to FIG. 3B, a cross-sectional side view of the electronic device 300 is shown wherein the support structure 320 is in an open position. In the open position, the support structure 320 extends laterally from the outer surface 310 of the device housing 305. As a result, the first portion 321 of the support structure 320 rotates into the indentation 312. In the open position, the protrusion 325a of the projecting element 325 engages with a second detent 314b disposed in the first curved section 314. The support structure 320 comprises a first inner surface 323 of the first portion 321 and a second inner surface 324 of the second portion 322.

When the support structure 320 is in the closed position, the second inner surface 324 may contact a stopping element 313a disposed on the first linear section 313. In other examples, additional stopping elements can be added so as to define the rotation of the support structure 320, for instance a stopping element on the surface of the first curved section 314 so as to contact the first inner surface 323.

However, in other examples, additional elements may not be used, since the support structure 320 defines its rotation by the engagement of the second detent 314b with the protrusion 325a and the contact of the second inner surface 324 with the stopping element 313a.

Figure 4:
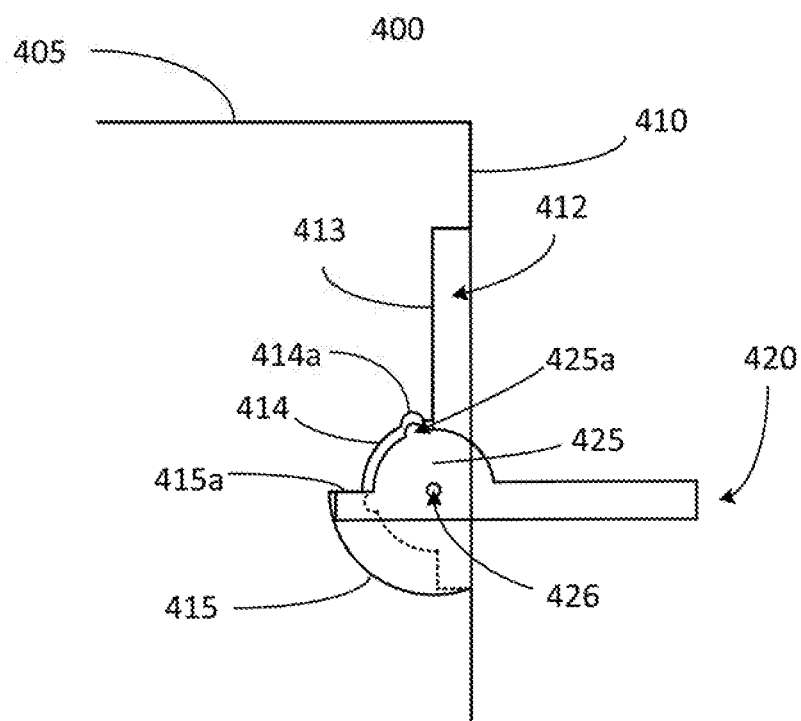
FIG. 4 shows a cross-sectional side view of a device housing and a support structure, according to an example of the present disclosure.

Referring now to FIG. 4, a cross-sectional side view of a device housing 405 and a support structure 420 is shown. The device housing 405 corresponds to the housing of an electronic device 400. The device housing 405 comprises an outer surface 410, wherein the outer surface 410 comprises an indentation 412. The indentation 412 comprises a set of detents so that a projecting element 425 of the support structure 420 can engage with the set of detents through a protrusion 425a. The support structure 420 is rotatable about a pivot element 426 between a first position in which the support structure 420 is aligned with the outer surface 410 of the device housing 405 and a second position in which the support structure 420 extends laterally relative to the outer surface 410. For illustrative purposes, the example of FIG. 4 shows the first position of the support structure 420 in dashed lines and a possible second position of the support structure 420 in solid lines.

As previously described, the indentation 412 may comprise different geometries. In FIG. 4, the indentation 412 comprises a first linear section 413, a first curved section 414, and a second curved section 415. The first curved section 414 comprises a detent 414a, and the second curved section 415 comprises a stopping element 415a. A radius of the first curved section 414 is smaller than a radius of the second curved section 415 so that an interface area between both sections defines the stopping element 415a.

In the first position, the protrusion 425a of the projecting element 425 is not engaged with the detent 414a of the set of detents. Instead, the first portion and the second portion of the support structure 420 are aligned with the outer surface 410 of the device housing 405. However, in the second position, the support structure 420 can rotate about the pivot element 426 until the protrusion 425a engages with the detent 414a and the inner surface of the first portion of the support structure 420 contacts with the stopping element 415a. In the second position, a hardware element can be supported by the support structure 420.

A shift from the first position to the second position may occur upon a force being applied against a first portion of the support structure 420, i.e., pushing the first portion of the support structure 420 inwards towards or into the second curved section 415. A shift from the second position to the first position may occur upon a force being applied against a second portion of the support structure 420, substantially opposite or distal from the first portion, i.e., pushing or rotating the support structure 420 inwards towards the first linear section 413.

Figure 5:
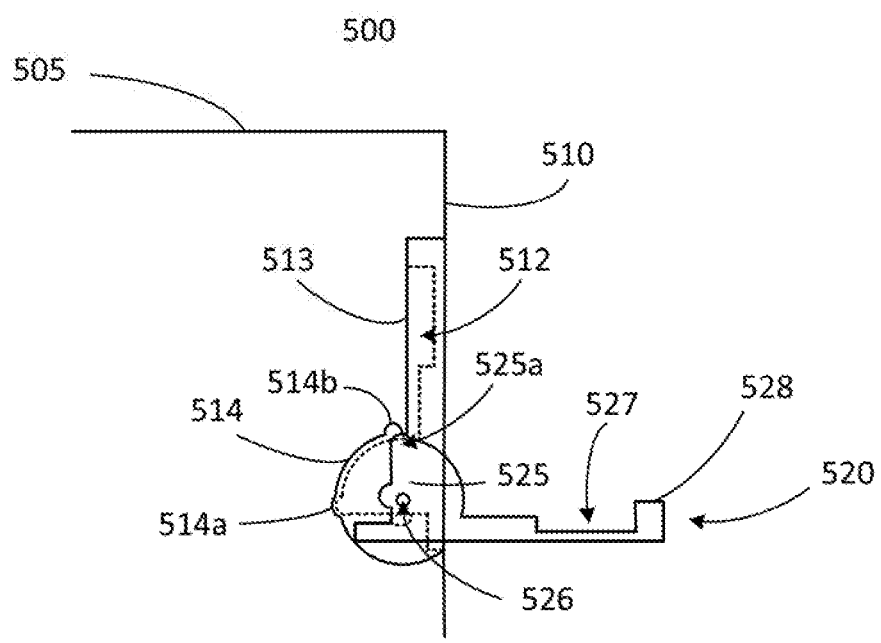
FIG. 5 shows a cross-sectional side view of a device housing and a support structure having a recess, according to an example of the present disclosure.

Referring now to FIG. 5, a cross-sectional side view of a device housing 505 and a support structure 520 having a recess 527 is shown. The device housing 505 may correspond to the housing of an electronic device 500. The device housing 505 comprises an outer surface 510, wherein the outer surface 510 comprises an indentation 512. For illustrative purposes, the example of FIG. 5 shows the closed position of the support structure 520 in dashed lines and a possible open position of the support structure 520 in solid lines.

In the example of FIG. 5, the indentation 512 comprises a first linear section 513 and a first curved section 514, wherein the first curved section 514 comprises a first detent 514a and a second detent 514b. The support structure 520 is rotatable about a pivot element 526 disposed within the indentation 512, wherein the support structure 520 comprises a projecting element 525 to engage with each detent of the set defined by the first detent 514a and the second detent 514b. The projecting element 525 engages with a detent of the set of detents through a protrusion 525a. The support structure 520 further comprises the recess 527 at a distal side of an inner surface of the support structure 520. A hook projecting element 528 is adjacent to the recess 527, wherein the combination of the recess 527 and the hook projecting element 528 may receive and support an external device, or a portion thereof. In other examples, the support structure 520 may not comprise the hook projecting element 528 and the recess 527 may be used to support an external device while the support structure 520 extends laterally.

In an example, the external device may be a headphone having a headband. In the open position of the support structure 520, the headphone may be hung on the support structure by placing the headband within the recess 527, whereby it is supported both vertically and laterally by the recess 527. In the closed position of the support structure 520, the support structure 520 is aligned with the outer surface 510 of the device housing 505.

According to an example, the indentation 512 of FIG. 5 may comprise a further curved section, as described in FIG. 4. The first detent 514a of the indentation 514 may be replaced with the stopping element generated by an interface area or wall between the first curved section and the second curved section. In other examples, the first linear section 513 may comprise a second stopping element to contact the hook projecting element 528. In some examples, the first linear section 513 may comprise a hook detent so as to engage with the hook projecting element 528 of the support structure 520 of FIG. 5.

According to an example, a system comprises a hardware element and an electronic device such as a computing device. The electronic device comprises a device housing having an outer surface, a pivot element disposed within an indentation, and a support structure rotatable about the pivot element. The indentation may be a cavity of the device housing relative to the outer surface. As previously described, the indentation comprises a set of detents that define a series of angular positions for the support structure. The support structure is disposed within the indentation and comprises a projecting element to engage through a protrusion with each detent of the set of detents. Upon applying a force against a first portion of the support structure, a second portion of the support structure is to protrude from the outer surface of the device housing so that the hardware element is supported by an inner surface of the second portion.

In an example, the electronic device may correspond to a support structure having a recess in the inner surface of the second portion. The hardware element may be disposed on the recess so as to provide a lateral movement of the hardware element which may cause undesirable damage over the hardware element.

In another example, the support structure may comprise a hook projecting element in the inner surface of the second portion, wherein the hook projecting element is to engage with a hook detent disposed within the indentation. In an example, the hook detent may be disposed on a first linear section of the indentation. In other examples, the hook projecting element may be used without the recess, as previously explained in the description.

In some examples, the hardware element is a headphone having a headband, wherein the headband contacts the inner surface of the second portion of the support structure in the open position of the support structure.

In some other examples, the hardware element may correspond to the examples previously described, such as headphones, earphones, computer mice, microphones, joysticks, remote controls, amongst other examples.

However, it should be noted that in other examples, the support structures and/or the device housings previously described in reference to FIGS. 1 to 5 may be combined so as to obtain a system in which a hardware element is supported by an electronic device.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. An electronic device comprising:
   a device housing having an outer surface, wherein the outer surface comprises an indentation extending inward from the outer surface to define a cavity within the device housing, the indentation including:
     a first curved section comprising a set of detents; and,
     a second curved section to engage with a first portion of a support structure and comprising a first stopping element;
   a pivot element disposed within the indentation; and,
   the support structure rotatable about the pivot element and disposed within the indentation, wherein the support structure comprises a projecting element having a protrusion to engage with each detent of the set of detents, the set of detents to define a series of angular positions of the support structure,
   wherein upon force being applied at a first portion of the support structure, the support structure is to rotate such that a second portion of the support structure is to protrude outward past the outer surface of the device housing while the first portion protrudes further into the indentation; and
   wherein the first stopping element is to contact an inner surface of the first portion of the support structure.

2. The electronic device as claimed in claim 1, wherein the indentation comprises:
   a second stopping element to contact an inner surface of the second portion,
   wherein the support structure is to rotate between the first stopping element and the second stopping element.

3. The electronic device as claimed in claim 2, wherein the indentation comprises:
   a first linear section aligned with the outer surface of the device housing and comprising the second stopping element;
   wherein the first curved section has a radius smaller than a radius of the second curved section.

4. The electronic device as claimed in claim 3, wherein the support structure is movable between a first position in which the support structure contacts the second curved section and a second position in which the support structure is aligned to the first linear section, wherein in the first position the first stopping element contacts the inner surface of the first portion and in the second position the second stopping element contacts the inner surface of the second portion.

5. The electronic device as claimed in claim 3, wherein the support structure comprises a recess in the inner surface of the second portion, wherein the recess is to support a hardware element when the first portion of the support structure engages with the second curved section.

6. A computing device comprising:
   a device housing having an indentation relative to an outer surface of the housing, the indentation extending inward from the outer surface to define a cavity within the device housing, wherein the indentation comprises:
     a first linear section aligned with the outer surface; and
     a first curved section comprising a set of detents;
     a second curved section comprising a stopper;
   a pivot element disposed within the indentation; and
   a support structure rotatable about the pivot element and disposed within the indentation, wherein the support structure comprises a projecting element to engage with each detent of the set of detents, wherein upon force being applied at a first portion of the support structure, a second portion of the support structure is to protrude outward past the outer surface of the device housing while the first portion protrudes further into the indentation; and wherein the stopper is to contact an inner surface of the first portion of the support structure.

7. The computing device as claimed in claim 6, wherein the set of detents are distributed along the first curved section so as to define a first lock position in which the support structure is aligned with the outer surface of the housing and a second lock position in which the support structure extends laterally from the outer surface of the housing.

8. The computing device as claimed in claim 6, wherein the indentation further comprises, and wherein a radius of the first curved section is smaller than a radius of the second curved section.

9. The computing device as claimed in claim 8, wherein the support structure further comprises a recess in an inner surface of the second portion to support a hardware element.

10. The computing device as claimed in claim 9, wherein the support structure further comprises a hook projecting element disposed adjacent to the recess, and wherein the first linear section of the indention comprises a cavity to receive the hook projecting element.

11. A system comprising:
a hardware element; and,
a computing device comprising:
 a device housing having an outer surface, wherein the outer surface comprises an indentation extending inward from the outer surface to define a cavity within the device housing, the indentation including:
 a first curved section comprising a set of detents; and
 a second curved section comprising a stopper;
a pivot element disposed within the indentation; and
 a support structure rotatable about the pivot element and disposed within the indentation,
wherein the support structure comprises a protrusion to engage with each detent of the set of detents, and
wherein upon applying a force against a first portion of the support structure, a second portion of the support structure is to protrude outward past the outer surface of the device housing so as to receive the hardware element, while the first portion protrudes further into the indentation; and
wherein the stopper is to contact an inner surface of the first portion of the support structure.

12. The system as claimed in claim 11, wherein the support structure is movable between:
an open position in which the hardware element is supported by the support structure; and
a closed position in which the support structure is aligned with the outer surface of the device housing.

13. The system as claimed in claim 12, wherein the hardware element is a headphone having a headband, wherein the second portion of the support structure is to support the headband when the support structure is in the open position.

14. The system as claimed in claim 11, wherein the support structure comprises a recess in an inner surface of the second portion, wherein a portion of the hardware element is to be disposed in the recess.

15. The system as claimed in claim 11, wherein the support structure further comprises a hook projecting element extending from the inner surface of the second portion, wherein the hook projecting element is to engage with a hook detent disposed within the indentation when the support structure is disposed in a closed position.

* * * * *